March 18, 1941.   E. L. HARDER   2,235,402
HIGH-SPEED RELAY SYSTEM
Filed April 21, 1938
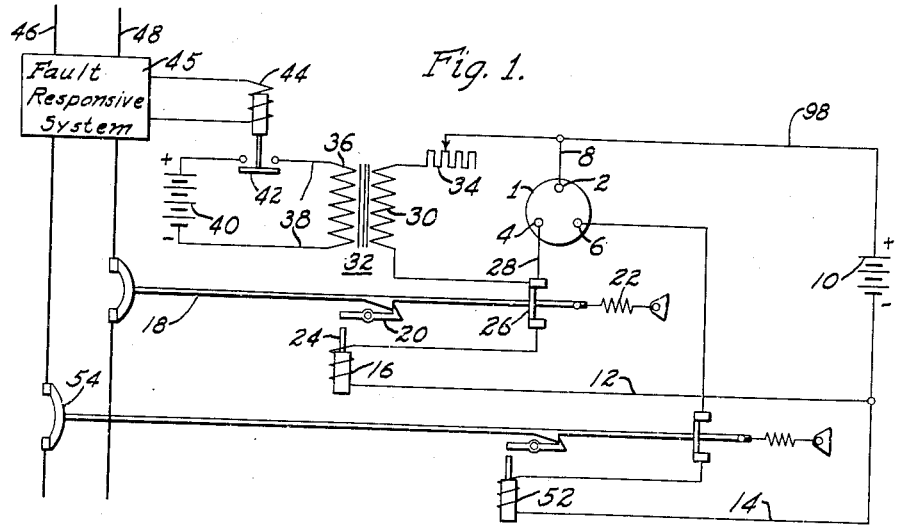
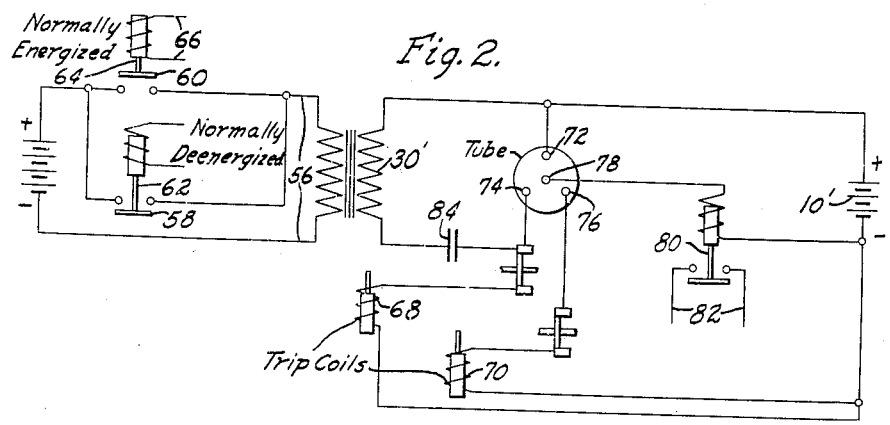
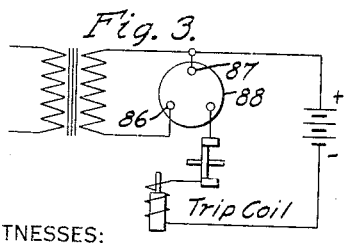
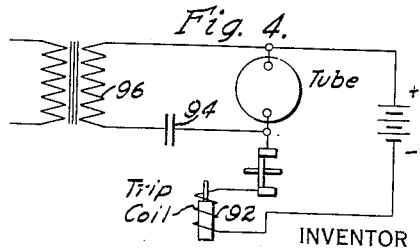
WITNESSES:
INVENTOR
Edwin L. Harder.
BY
ATTORNEY Patented Mar. 18, 1941

2,235,402

UNITED STATES PATENT OFFICE 2,235,402

HIGH-SPEED RELAY SYSTEM

Edwin L. Harder, Forest Hills, Pa., assignor to Westinghouse Electric & Manufacturing Company, East Pittsburgh, Pa., a corporation of Pennsylvania Application April 21, 1938, Serial No. 203,299

7 Claims. (Cl. 175—294)

My invention relates generally to high-speed relay action such as finds many applications in electrical systems of which signalling, supervisory control and protective systems for transmission lines, power apparatus and the like are a few examples. The efficacy of such systems frequently depends upon rapid and reliable relay action, which may be required in addition to be sufficiently powerful so that large and massive units of apparatus may be controlled or operated, or opposing forces overcome.

Accordingly, it is a general object of my invention to provide a relay system which is rapid in its action, which is reliable in its action, and which is powerful in its action.

In protective systems, the most recent developments, particularly for larger systems and apparatus, seek the tripping of large and massive circuit breakers within a maximum of a few cycles or less, after the occurrence of a fault for the known reason that the quicker a fault is cleared, or the surrounding apparatus isolated or disconnected, the less the possible damage and the less the shock to the system as evidenced by stalling of synchronous motors, or other damaging effects. The time involved in the automatic tripping of circuit breakers usually is composed of two factors. The first of these is the time involved in the operation of what is known as the measuring relay or relay system set into operation by the occurrence of an abnormal condition or a signal impulse and is the medium through which the power supply to the heavier apparatus, such as the circuit breaker, is controlled. The second factor is the time involved in operating the heavier apparatus after the inception of its operation by the relay system. In high-speed relaying an auxiliary relay action within one cycle is deemed exceptional.

The auxiliary relay is a relay controlled by the main measuring relay and used to increase the effective number of contacts of the main measuring relay and to make the trip circuits, once closed, stay positively closed for the required time, inasmuch as the main measuring relay contacts operating with light operating forces may not make a sufficiently positive contact in many cases. This auxiliary relay must have negligible operating time compared with the main measuring relay if the highest available overall relay speed is to be secured.

It is a further object of my invention to provide a relay system operable to control the heavier power sources within a fraction of a cycle after the receipt of an impulse indicating the necessity or desirability for a change in the position of a circuit breaker.

In one specific embodiment of my invention, I employ a tube which changes from a non-conducting to a conducting state practically instantaneously upon the application of a control voltage sufficient to bring about the change. I choose a tube capable of conducting a large current for a time sufficient to operate the more massive units to be controlled. To obtain the aforesaid control voltage, I employ a transformer, the primary of which is in a normally open circuit including a direct-current source of power which may be in the form of a battery. Upon closure of this circuit, the rate of change of the current in the circuit must be sufficiently great to induce a voltage substantially equal to that of the direct-current source. This changing current simultaneously induces an electromotive force in the secondary of the transformer which is instantly transmitted to the control electrodes of the tube, causing breakdown of the latter. I may choose a tube having more than one current path through it so that a plurality of units of apparatus may be initiated into operation at the same time and from the same cause or I may apply the same impulse to several tubes to further increase the number of circuits instantly controlled.

It is, therefore, a more general object of my invention to provide a relay system operable by a transient impulse.

My invention has other novel features, elements and objects not particularly stated above, but which will be evident from the following detailed description taken in conjunction with the accompanying drawing, in which:

Figure 1 is a diagrammatic view showing one embodiment of my invention; and

Figs. 2, 3 and 4 show diverse modifications or embodiments employing the general principles of my invention.

Referring more particularly to the embodiment shown in Fig. 1, the tube 1 is of the discharge type capable of sustaining a high current at least for a short time. Many tubes are well known which have this characteristic but the particular tube I prefer to use in this system is known in the art as "KX642 tube." Such a tube is capable of carrying 100 amperes for approximately two seconds. For further details of such a tube, reference may be had to Patent No. 1,649,035, granted November 15, 1927, to J. L. McCoy. The tube is of the cold cathode type, and in Fig. 1 is shown as containing three equally spaced electrodes 2, 4 and 6. The tube has the characteristic of being non-conductive until a potential of approximately 300 volts is applied between a pair of electrodes, and becomes conducting when its breakdown voltage is applied, as is well known.

Connected to one of the electrodes 2 by means of a conductor 8 is the positive terminal of a battery 10. The negative terminal of the battery 10 has two parallel branch circuits connected thereto by means of conductors 12 and 14. Conductor 12 connects to an electrically operated device 16, which, in the specific instance, is the trip coil of a circuit breaker shown symbolically at 18. The circuit breaker 18 comprises parts which are shown diagrammatically in Fig. 1, and which include a latch 20 for retaining the circuit breaker in closed position against the retracting force of a spring 22.

Upon energization or operation of the trip coil 16, a plunger 24 rises to trip the latch 20, permitting the circuit breaker to open. The circuit of the trip coil 16 is completed through a contactor 26 and a conductor 28 leading to the electrode 4 of the tube 1. The purpose of the contactor 26 is to break the circuit through the tube 1 and trip coil 16 upon operation or the inception of the operation of the circuit breaker 18.

Connected across one pair of electrodes 2 and 4 is the secondary 30 of a transformer 32. A resistance 34, shown as variable, is inserted in series in this connection for the purpose of limiting the current through the secondary. The primary winding 36 of the transformer is part of the control circuit 38 which includes a battery 40 and a circuit closing contactor 42 which may be operated by any appropriate mechanism. In the specific example, I have shown the contactor 42 as part of a relay having an operating coil 44, which is energized by a fault responsive system 45 of any well-known type whenever an abnormal condition presents itself in the power lines 46 and 48.

The operation of the system thus far described is as follows: The voltage of battery 10 is insufficient to cause breakdown of the tube 1. When contactor 42 is closed, the direct-current circuit is completed through the primary winding 36. In accordance with Kirchoff's law, the sum of the potentials around the control circuit 38 at the instant of closure of the contactor 42 must be equal to zero. Inasmuch as the inductance of the primary winding 36 prevents instantaneous flow of current, the potential of the battery 40 can be opposed only by the electromotive force of induction in the primary during the tendency of the current to increase in the circuit 38. The changing current also induces an electromotive force in the secondary of the transformer 32, and this electromotive force is applied directly across the electrodes 2 and 4 in the embodiment shown in Fig. 1. The voltage of the battery 40 and the design of the transformer 32 are so chosen for any particular tube that the electromotive force induced in the secondary is much more than sufficient to cause breakdown of the tube 1. For the particular tube described I prefer to use a 125 volt battery at 40, and a transformer having a step-up ratio of 10 turns of secondary to one on the primary. Immediately upon the breakdown of the tube 1, the voltage of battery 10 is sufficient to maintain the heavy flow of current, since, as is well known, it is characteristic of a discharge tube to be able to sustain current at a voltage much lower than that necessary to cause its breakdown. Tube 1 having been rendered conducting, the circuit previously described through the trip coil 16 is completed, thereby tripping the circuit breaker 18 in an obvious and well known manner. Upon tripping of the circuit breaker 18, the contactor 26 moves to circuit opening position, thereby interrupting current through the tube 1 and preventing damage thereto or its rapid deterioration.

I prefer to so connect the batteries 10 and 40 and to so pole the transformer 32 that upon the surge of current through the control circuit 38, the electromotive force of induction in the secondary 30 will be positive towards the electrode 2. It will be observed that the secondary 30 is connected across a pair of electrodes 2 and 4, and I term these two electrodes "control electrodes."

It is obvious that the tube 1 will respond substantially instantaneously to closure of the circuit 38 by the contactor 42, since at the instant of closure of contactor 42 the rate of change of current in the circuit 38 is at its maximum, and the voltage induced in the secondary is directly dependent upon this rate of change. Accordingly, it is obvious that the time involved between the operation of the contactor 42 and the energization of the tripping device 16 is practically negligible, or in the terms of ordinary commercial alternating current occurs within a fraction of a cycle. This is an important feature and advantage of my invention, since, by utilizing the induced electromotive force due to the first surge of current in the circuit 38, I provide a device substantially instantaneously responsive to operation of the circuit 38. The moving parts of the relay comprising the contactor 42 and operating coil 44 may be made small and light, in order to minimize the time lag of this relay. Inasmuch as there is practically no appreciable current required to be made or broken by the contactor 42, a very small contactor is sufficient for the purpose and a correspondingly smaller force is needed to operate it, the smaller force permitting an operating coil of lower inductance and, therefore, capable of acting more rapidly upon the contactor 42.

I have shown the tube in Fig. 1 as comprising three electrodes. The third electrode 6 can be connected to a second tripping coil 52 of a circuit breaker 54, the circuit for this tripping coil 52 being substantially the same as that described for the tripping coil 16 and comprises the second branch conductor 14, as is apparent from the drawing. While the addition of a second electrical device decreases the amount of current flowing through the first electrical device, nevertheless, by using a tube of larger capacity I need not increase the time for operation of the circuit breaker.

The modification shown in Fig. 2 has essentially the same characteristics and principles of operation as the embodiment shown in Fig. 1. However, I show the circuit 56, which corresponds to the circuit 38 of Fig. 1, as capable of being completed by two contactors 58 and 60 of relays 62 and 64, respectively. The relay 62 may, for example, be of the instantaneous type responsive to a fault in the electric system or unit similar to unit 44 of Fig. 1. It will be understood that in the practical embodiment of my invention as applied to high-speed protective apparatus, the relay will assume the form of one of the more elaborate high-speed relay arrangements familiar to those skilled in the art. The relay 64, which I show as normally energized, but which can obviously be normally deenergized, may be part of any supervisory control and operable by signal impulses in the line 66. These impulses may be created in any manner well known in the art, as, for example, by carrier current. Upon closure of the circuit 56, the circuit breaker trip coils 68 and 70 will be caused to operate for the reasons set forth above in the description of the operation of Fig. 1.

The modification of Fig. 2 differs further from the embodiment of Fig. 1 in the provision of a tube having four equally spaced electrodes 72, 74, 76 and 78. Such equal spacing may be obtained, of course, by positioning them at the corners of an imaginary regular tetrahedron. To the fourth electrode 78 I may connect a relay 80 for closing a circuit 82 which may be a signal circuit, an answer-back circuit or any other type of circuit, as is well known in the art. Whereas Fig. 1 shows a current limiting resistance 34, I eliminate this resistance in the embodiment of Fig. 2 and substitute therefor a condenser 84. The condenser 84 interrupts the complete circuit extending from the battery 10' through the electrically operable device 68 and secondary winding 30'. In this way, the system does not consume any power in its inactive state. In Fig. 1, however, it will be apparent that a small amount of current will continually flow through the circuit including the conductor 12 and secondary 30. At times, this current may be advantageous in aiding to bias the electrically operable device 16, but at other times may be disadvantageous in that it tends to magnetize the transformer 32. It is to be understood, however, that either a condenser or a resistance or both may be used in series with the secondary 30, depending largely upon the particular adaptation of my invention for a specific purpose. In Fig. 3, I show a circuit in which neither a resistance nor a capacity is used in series with the secondary of the transformer. In this circuit, it may be observed that one terminal of the secondary connects to a control electrode 86, and that this electrode has no other connection. This isolates the secondary circuit. When the tube 88 breaks down, the number of paths will correspond to the number of electrodes less one.

Fig. 3 further indicates how my invention may be adapted to any of the more common tubes having an independent control electrode, frequently called a grid, since the control electrode 86 may take that form in some types of tubes. In this instance, the electrodes 86 and 87 form electrodes between which the discharge initiating electromotive force is applied and, therefore, may be deemed conjunctively the control electrodes.

Fig. 4 shows a further modification in which a two-element tube is shown as controlling an electrical devices 92. In this embodiment, the condenser 94 interrupts the circuit through the battery, the electrically operated device 92 and the secondary 96.

While I have described my invention in certain specific forms which I now believe to be the most desirable modes of application thereof, it is obvious that many changes may be made within the spirit and scope of the novel system which I have introduced. For example, instead of a separate resistance 34, the secondary winding of the transformer may be wound of wire having sufficient resistance to accomplish the desired purpose. Moreover, while the transformer has been shown as invariable in the figures, it is obvious to one skilled in the art that greater flexibility may be obtained by making this transformer variable. Also, the length of the different conductors in the control circuit, of which 38 is typical, or in the operating circuit, which includes the conductors 12, 14 and 98, may be great or small, depending upon the location of the apparatus to which my invention is applied. It is desired, therefore, that the appended claims be given the broadest construction consistent with their language and limited only by the prior art.

I claim as my invention:

1. A high-speed relay system comprising a step-up transformer having a primary and a secondary, a direct-current control circuit connected to said primary, a discharge tube having high conducting capacity, two control electrodes and a plurality of other electrodes, an operating circuit including a direct-current source connected to said tube, means connecting said control electrodes to said secondary and including a condenser, parallel paths in said operating circuit, and including said plurality of electrodes and also one of said control electrodes, electrically operable devices in each of said parallel paths, and a potentializing conductive circuit including a direct-current potential means, for said tube connected across said control electrodes.

2. A system comprising a normally inactive direct-current control circuit, a tube with a pair of control electrodes, and having two conditions of operation, inductive means connected in said control circuit, means including a series condenser connecting said inductive means to said pair of electrodes, said tube changing from one of its conditions of operation to a second condition by the transient created upon the first said circuit becoming active, direct-current electric power means and an electric device connected to said pair of electrodes, said electric device including means to permit said tube to remain in said second condition only momentarily.

3. A system comprising a direct-current control circuit of predetermined, fixed electrical characteristics, circuit-controlling means for said circuit for creating a transient voltage therein dependent on said characteristics, a tube having control electrodes, an operating circuit controlled by said tube, and inductive means included in said control circuit for rendering said tube operative for controlling said operating circuit in response to said transient.

4. A system comprising a transformer having a primary and a secondary, a control circuit connected to said primary and including a direct-current source of voltage, means to control the energization of said control circuit to create an instantaneous transient voltage in said circuit to balance the voltage of said direct-current source, means including a tube having two conditions of operation, said tube including a pair of control electrodes connected to said secondary, whereby said transient voltage created in said control circuit is transmitted through said primary to said secondary to effect a substantially instantaneous change in the condition of said tube, and an electrical device operable by such change in the condition of said tube.

5. A system comprising a transformer including a primary and a secondary, a control circuit conected to said primary and including a direct-current source of voltage, means to control the energization of said control circuit to create an instantaneous transient voltage in said circuit to balance the voltage of said direct-current source, means including a discharge tube having two conditions of operation, said tube including a pair of control electrodes connected to said secondary whereby said transient voltage created in said control circuit is transmitted through said primary to said secondary to affect a substantially instantaneous change in the condition of said tube, additional voltage means to maintain said tube in its changed condition, an electrical device operable by such change in the condition of said tube, and means to restore said tube to the other of its conditions after initiating operation of said electrical device.

6. A high-speed protective system for an electric power circuit comprising fault-responsive means operable by faults in said circuit, said means including circuit-controlling means, a control circuit of predetermined, fixed electrical characteristics, including inductive means and a direct-current source connected to said inductive means, and under control of said circuit-controlling means for establishing an induced transient voltage across said inductive means dependent on said predetermined, fixed electrical characteristics of said control circuit, a tube having control electrodes connected to said inductive means, and an operating circuit including said tube, said operating circuit being normally inactive but rendered active by a change in the condition of said tube caused by said transient voltage.

7. A system comprising a normally open direct-current control circuit, means for closing said control circuit, a tube with a pair of control electrodes, and having two conditions of operation, inductive means connected in said control circuit, means including a series condenser connecting said inductive means to said pair of electrodes, said tube changing from one of its conditions of operation to a second condition by the transient created upon closure of said control circuit, and direct-current electric power means connected to said pair of electrodes for biasing said tube for changing its condition.

EDWIN L. HARDER.